United States Patent [19]
Carpenter

[11] 3,744,376
[45] July 10, 1973

[54] PRESSURE FLUID CONTROL ARRANGEMENT AND METHOD
[75] Inventor: William T. Carpenter, Stanley, N.C.
[73] Assignee: Synalloy Corporation, Spartanburg, S.C.
[22] Filed: Mar. 16, 1972
[21] Appl. No.: 235,314

[52] U.S. Cl.................... 91/414, 137/597, 91/471
[51] Int. Cl........................ F15b 11/16, F15b 13/06
[58] Field of Search............................ 91/414, 471; 137/597; 235/201 ME, 201 PF, 201 FS

[56] References Cited
UNITED STATES PATENTS
321,745  7/1885  Nelson.................................. 91/414
3,422,728  1/1969  Black et al............................ 91/414
3,512,553  5/1970  Legris.................................. 137/597

Primary Examiner—Edgar W. Geoghegan
Attorney—Daniel E. McConnell

[57] ABSTRACT

A control arrangement and method wherein the interconnection of a plurality of pressure fluid actuated devices with a plurality of pressure fluid control devices is accomplished through a matrix block in such a manner as to facilitate assembly and modification of the control arrangement. Flow of pressure fluid through passageways formed in the matrix block is controlled by the positioning of diode valves or plugs at the intersections of passageways in the matrix block and prompt reaction of the pressure fluid actuated devices is assured by coordination of application and relief of pressure thereto.

10 Claims, 5 Drawing Figures

3,744,376

PRESSURE FLUID CONTROL ARRANGEMENT AND METHOD

Pressure fluid control systems, and particularly pneumatic control systems, are frequently employed in connection with various industrial operations. One particular example of such control arrangement, included herein for purposes of illustration only, is the sequential opening and closing of a plurality of valves through which liquid is supplied to and drained from a textile treating apparatus such as a dyeing machine or washing machine. In such an industrial application, pressure fluid is applied to a plurality of pressure fluid actuated devices, such as the liquid flow controlling valves, on passage from a plurality of pressure fluid control devices. The pressure fluid control devices typically are valves or the like which may be manually operated or which may form a portion of a process controller which opens and closes the valves in a particular timed sequence.

Heretofore, the passage of control pressure fluid from the control devices to the actuated devices typically was accomplished by control piping systems. With such control piping systems, any desired change in the control arrangement, such as a change in the sequence of actuation of the actuated devices or a change in the coordination of actuation of a plurality of actuated devices, typically required changes in the control piping. Particularly in a complicated control arrangement, such modifications of permanent control piping give rise to difficulty in assuring that proper interconnections are being established and in subsequent tracing of the interconnections which exist at any given time. Further, difficulty is frequently encountered in obtaining proper sequential operation of the actuated devices due to retention of pressure fluid in the various piping lines.

It is an object of the present invention to overcome the difficulties and deficiencies of prior control arrangements, by particularly facilitating the assembly and modification of control arrangements of the type described hereinabove. In accomplishing this object of the present invention, a matrix block having a plurality of sets of passageways therethrough is used to advantage in centralizing the interconnection of the plurality of pressure fluid actuated devices and the plurality of pressure fluid control devices. The matrix block in accordance with this invention has formed therein a first series of parallel passageways arranged generally in a first plane, a second series of parallel passageways therein extending perpendicular to the first passageways and arranged generally in a second plane parallel to the first plane, and a third series of parallel passageways perpendicular to both of the first and second passageways. Each of the third passageways penetrates a corresponding pair of first and second passageways for opening communication therebetween and receives either a diode valve permitting flow therethrough only from the corresponding one of the first passageways toward the corresponding one of the second passageways or a plug which blocks flow through the third passageway. By selecting the locations of the diode valves and plugs and by relocating the diode valves as may be required, the assembly and modification of the control arrangements is facilitated.

It is a further object of this invention to facilitate improved operation of the pressure fluid actuated devices interconnected by means of a matrix block through provision of venting for the matrix block passageways which are operatively connected with actuated devices. In realizing this object of the invention, a control pressure is derived from the matrix block passageways which are connected with control devices and fluctuation in pressure applied through the control devices is used to control operation of a venting arrangement for all of the passageways which are connected with actuated devices. By such an arrangement, each step by step change in the sequence of operation of the control arrangement results in dumping of any pressure which otherwise would be retained in the control arrangement from prior steps of actuation, thereby assuring that devices which are to become unactuated perform in a proper manner.

Some of the objects and advantages of the invention having been stated, others will appear as the description proceeds, when taken in connection with the accompanying drawings, in which —

Figure 1:
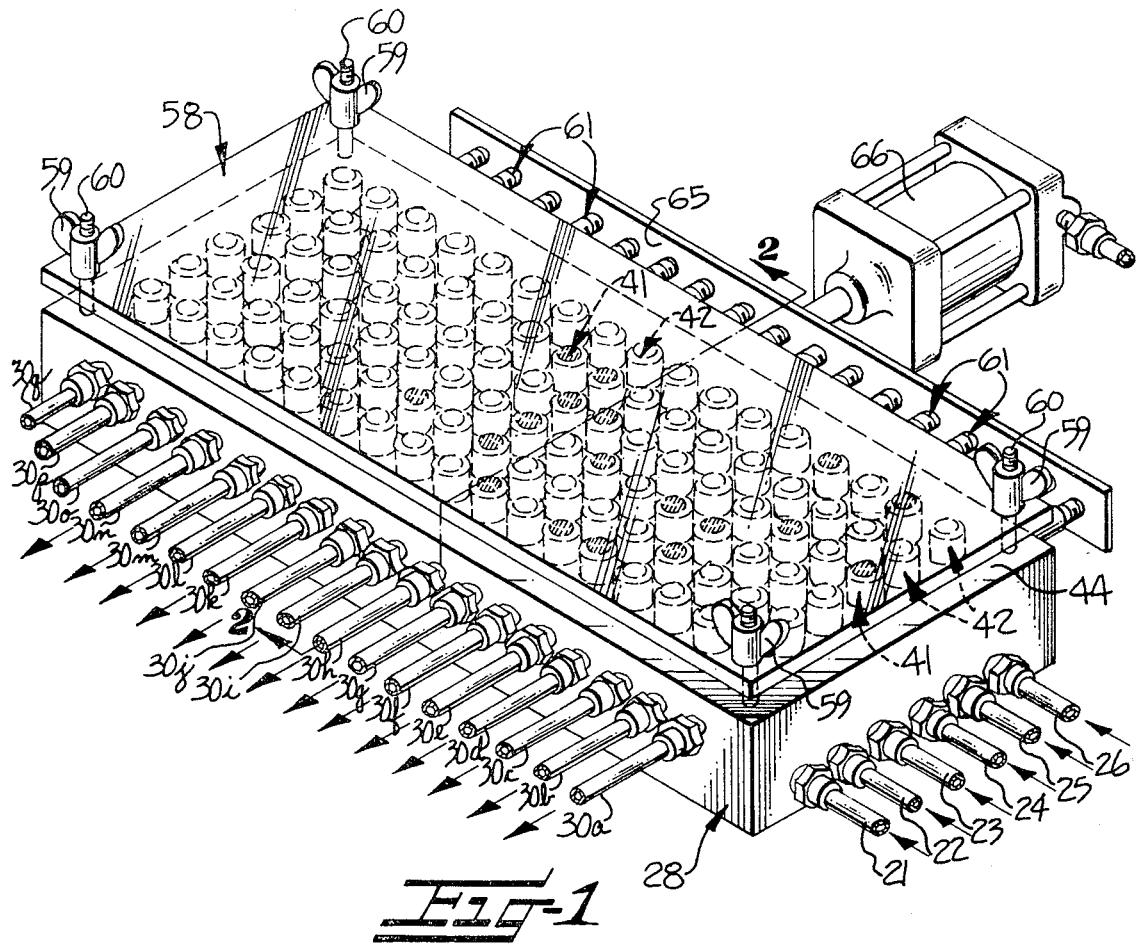
FIG. 1 is a perspective view of the improved interconnection means of this invention.

In the drawings referred to hereinabove and the detailed description which follows with reference to those drawings, the present invention has been illustrated and will be described as embodied in a particular preferred embodiment. At the outset, it is to be understood that the preferred embodiment which is illustrated and described is to be viewed as the best form presently contemplated for this invention, but is not to be considered as limiting upon the applicability of this invention.

Figure 5:
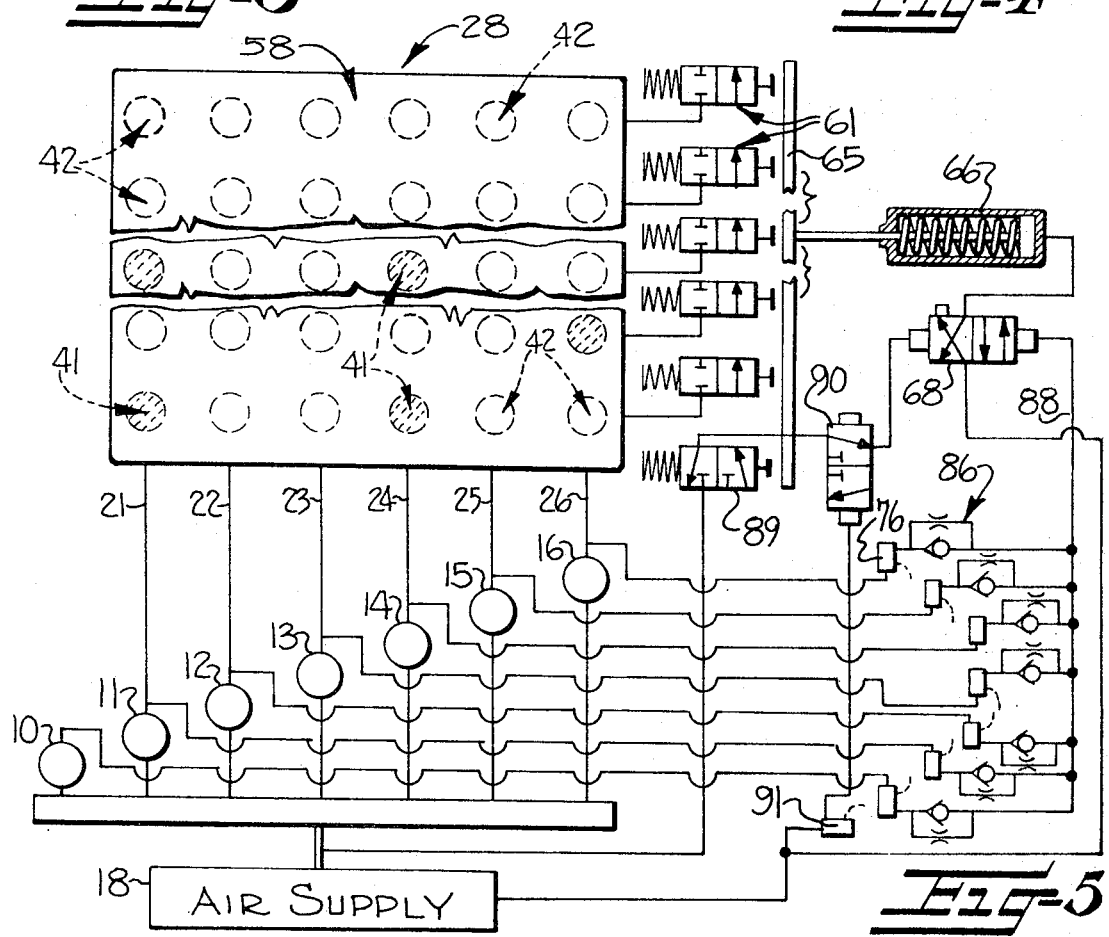
FIG. 5 is a schematic diagram of a control arrangement in accordance with this invention.

The present invention is applicable to control arrangement wherein a plurality of pressure fluid actuated devices (not illustrated) respond to passage of pressure fluid thereto from a plurality of pressure fluid control devices. In the illustrated embodiment, the pressure fluid control devices take the form of a plurality of manual valves 10, 11, 12, 13, 14, 15 and 16 supplied with a control pressure fluid such as compressed air from a suitable supply means 18 (FIG. 5). By means of suitable conduits 21, 22, 23, 24, 25 and 26, a plurality of the pressure fluid control devices communicate with a matrix block means 28.

The matrix block means 28 defines interconnecting conduits through which fluid pressure flows from the control devices to the actuated devices. For purposes of connection with actuated devices, a plurality of outlet conduits 30a through 30q are provided. Operative communication between the pressure fluid supply conduits 21 through 26 and the pressure fluid delivery conduits 30a through 30o is established through the matrix block means 28 as will be described hereinafter.

Figure 2:
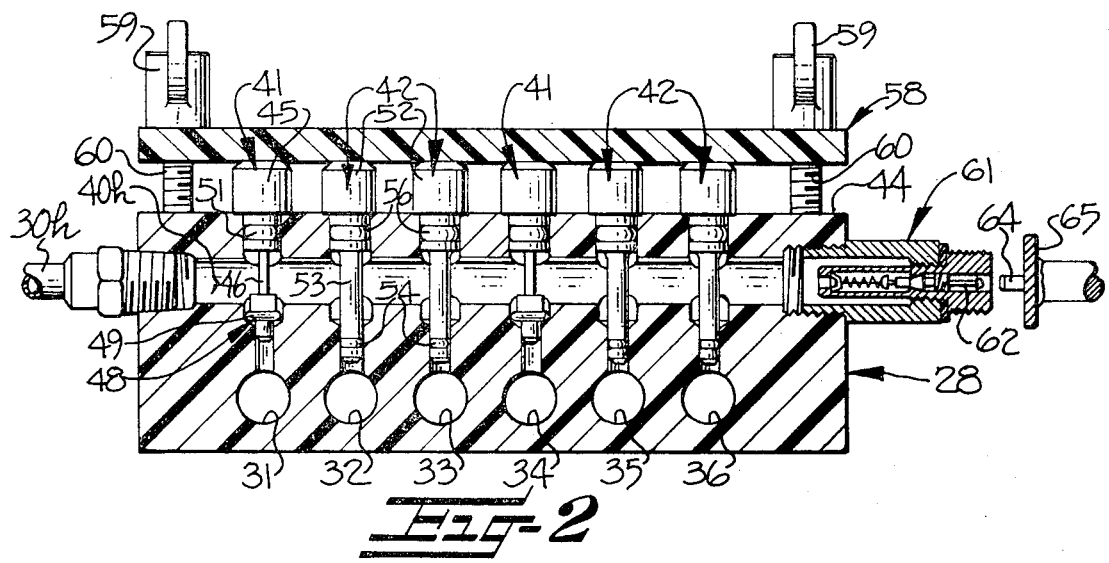
FIG. 2 is an elevation view, in section, through portions of the interconnection means of FIG. 1.

Each of the pressure fluid inlet conduits 21 through 26 opens into and operatively communicates with a corresponding one of a first series of parallel passageways 31, 32, 33, 34, 35 and 36 extending within the matrix block means 28 in a parallel array and arranged generally in a first plane. Each of the outlet conduits 30a through 30q opens from and communicates with a corresponding one of a second series of parallel passageways 40a through 40q extending through the matrix block means 28. One of such second passageways, mainly a passageway 40h, is shown in FIG. 2. The remainder of the second series of passageways are arranged parallel to the illustrated passageway 40h and generally in a common plane therewith. However, each of the second series of passageways extends perpendicular to the first passageways 31 through 36. By separation of the respective first and second planes in which the first and second series of parallel passageways are arranged, the passageways extend through spaced portions of the matrix block means 28.

In order to open communication between pairs of first and second passageways, a third series of parallel passageways extend within the matrix blocks means 28 perpendicular to both the first and second passageways, with each of the third passageways penetrating a corresponding pair of first and second passageways. As illustrated in FIG. 2, each of the second passageways, such as the passageway 40h, is penetrated by six of the third passageways so that a possibility of communication between the second passageway 40h and each of the first passageways 31 through 36 is opened. The number of third passageways corresponds to the number of first passageways times the number of second pasageways (or in the illustrated embodiment, 102).

In accordance with the present invention, each of the third passageways has inserted thereinto either a diode valve means (FIG. 3) or a plug means (FIG. 4) in order to govern the possibilities of flow between the corresponding first and second passageways. The diode valve means, generally indicated at 41, are removably disposed in certain of the third passageways for permitting flow therethrough only from the corresponding one of the first passageways (as for example 31 and 34 in FIG. 2) toward the corresponding one of the second passageways. The plug means, generally indicated at 42, are removably disposed in the remainder of the third passageways for blocking flow therethrough between the first and second passageways.

Figures 3, 4:
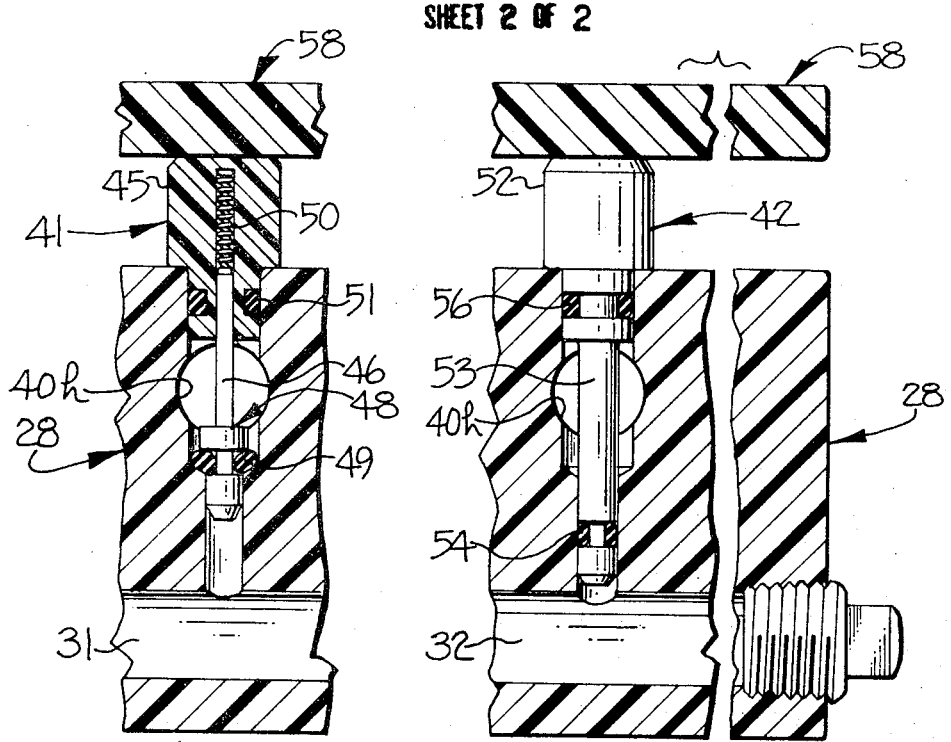
FIG. 3 is an enlarged view, in section, through a portion of the apparatus illustrated in FIGS. 1 and 2, particularly showing a diode valve.
FIG. 4 is a view similar to FIG. 3, particularly showing a plug.

In accordance with this invention, each of the third passageways penetrates into the matrix block means 28 from a first surface 44 thereof and each of the third passageways comprises a first bore portion of predetermined diameter which penetrates through the corresponding one of the second passageways (FIGS. 2 through 4). A second bore portion of lesser diameter penetrates into the corresponding one of the first passageways, and a shoulder portion is provided intermediate the first and second passageways at the juncture of the first and second bore portions. This shoulder portion provides a seating surface for a valving means of the diode valve means (FIGS. 2 and 3).

More Particularly, each of the diode valve means 42 comprises a head portion 45 for entering into the first bore portion of one of the third passageways, a stem means 46 which extends from the head portion 45 for penetrating into the third passageway, and valving means 48 mounted on the stem means 46 for flow sealing engagement with the shoulder portion of the third passageway. In the form illustrated, the valving means 48 comprises an enlarged terminal end portion of the stem means 46 and an elastomeric O-ring 49 mounted thereon. By means of a biasing spring 50 within the head portion 45, the valving means 48 is urged toward sealing engagement with the shoulder portion of the third bore. In order to prevent leakage flow of pressure fluid past the head portion 45, a sealing ring 51 is provided at the portion thereof which enters into the passageway. As will be understood, an increase in pressure in a first passageway (for example, the first passageway 31 in FIG. 2) will overcome the biasing force exerted by the spring 50, driving the valving means 48 upwardly or toward the first surface 44 of matrix block means 28. With such movement of the valving means 48, flow of pressure fluid is permitted from the first passageway 31 into the second passageway 40h. However, a decrease in pressure in the first passageway 31 will result in the combined force of the spring 50 and pressure of fluid in the second passageway 40h urging the valving means 48 toward a seated position. Thus, the designation of the valve means 41 as "diode valves" becomes more clear in that flow through the valves is permitted in one direction only.

In distinction from the diode valve means 41, each of the plug means 42 comprises a head portion 52 for entering into the first bore portion of one of the third passageways, a stem portion 53 extending from the head portion 52 for penetrating into the third passageway and a sealing ring 54 mounted on the stem means 52 for penetrating into the second bore portion of the third passageway and for precluding flow therethrough. Desirably, the plug means 42 may be formed from a single unitary piece of material, such as by turning an appropriate shape from steel or the like. In order to assure that fluid leakage is precluded, the head portion 51 of the plug means 42 is also provided with a sealing ring 56.

For purposes of identification as brought out more fully hereinafter, it is preferred that the head portions of the diode valve means 41 and plug means 42 be given distinctive colorations, such as by spotting paint onto the heads of the valve means 41.

In order to retain the valve means and plug means 41, 42 in assembled relation with the matrix block means 28 and to permit ready determination of the paths of operative communication through the matrix block means 28, transparent retainer means generally indicated at 58 are provided to overlie the first surface 44 of the matrix block means 28 and to engage the head portions of the diode valves and the plugs. Preferably, the retainer means 58 is provided by an appropriate sheet of transparent thermoplastic material and is retained in operative position by a plurality of wingnuts 59 engaging corner bolts 60. Due to the distinctive coloration of the head portions of the valve means 41 and plug means 42 and the transparent nature of the retainer means 58, a person observing a control arrangement in accordance with the present invention may readily ascertain the paths by which pressure fluid may flow to any given actuated device connected with one of the fluid delivery outlet conduits 300a through q.

In order to release any pressurization of the second passageways 40a through 40i upon a change in pressure with any of the first passageways 31 through 36, the present invention provides relief means (FIGS. 1 and 5) operatively communicating with both the first and second series of passageways. More particularly, each of the second series of passageways 40a through 40q is provided with a relief valve means generally indicated at 61. The relief valve means is of the type normally biased toward a closed position and operable to an open position upon depression of a valve stem 62. For purposes of releasing pressurization, a plurality of actuating pins 64 are provided, mounted at properly spaced distances along an actuating bar 65, for simultaneously opening the relief valves of all of the second passageways. Displacement of the mounting bar 65 and thus of valve actuating pins 64 is governed by a pressure fluid actuated cylinder 66, provided with a spring which normally biases the actuating bar 65 toward a retracted position.

Movement of the bar 65 toward an actuated position, and concomitatn relief of pressurization in the second passageways, is governed by a control valve 68 operatively communicating with the air supply 18 and the cylinder 66. The position of the spool of the valve 68 is governed by pressure sensed in the supply conduits 21 through 26.

By way of example, in the event that the pressure fluid control device 16 is opened to admit control pressure fluid to the conduit 26, such admission of pressure fluid causes a pulse signal to be passed through a corresponding pulse valve 76 and one way flow restriction 86. Such a pulse, when applied to a signal conduit 88, shifts the spool of the control valve 68 (to the left in FIG. 5) applying pressure fluid to the cylinder 66 and displacing the mounting bar 65 to actuate in unison all of the relief valves for the second passageways. With opening of the relief valves for the second passageways any pressurization present in those passageways is dumped, thereby assuring a more quick return to inoperative condition of the actuated devices served by those passageways. Simultaneously, a reset valve 89 is actuated, delivering pressure fluid to the control valve 68 through an intermediate control valve 90 and resetting the spool of the control valve 68 so as to relieve the pressure from cylinder 66. Thus, the movement of the mounting bar 65 is momentary only.

Initiation of the operation of the control arrangement in accordance with the present invention includes relief of any pressure from the spool of the control valve 68 through application of a control pulse to the intermediate control valve 90 by means of a pulse valve 91 and an initial clearing of the second series of passageways by actuation of an initiator control valve 10. Thereafter, the desired sequence of control may be carried out by successive opening and closing of the control devices 11 through 16 either manually or under the impetus of a controller of a known type.

In the drawings and specification, there has been set forth a preferred embodiment of the invention, and although specific terms are employed, they are used in a generic and descriptive sense only and not for purposes of limitation.

That which is claimed is:

1. In a control arrangement wherein a plurality of pressure fluid actuated devices respond to passage fluid from a plurality of pressure fluid control devices, an improved interconnection means for facilitating assembly and modification of the control arrangement and comprising:

matrix block means for defining interconnecting conduits through which pressure fluid flows from said control devices to said actuated devices and having a first series of parallel passageways therein arranged generally in a first plane, a second series of parallel passageways therein extending perpendicular to said first passageways and arranged generally in a second plane parallel to said first plane, and a third series of parallel passageways perpendicular to both said first and said second passageways, each of said third passageways penetrating a corresponding pair of first and second passageways for opening communication therebetween, diode valve means removably disposed in certain of said third passageways for permitting flow therethrough only from the corresponding one of said first passageways toward the corresponding one of said second passageways, and plug means removably disposed in the remainder of said third passageways for blocking flow therethrough between said first and second passageways, whereby control devices and actuated devices may be interconnected respectively with said first series of passageways and said second series of passageways in any arrangement, any selected control device may be arranged for operative interconnection with any selected actuated device by disposition of one of said diode valve means in the one of said third series of passageways which penetrates the corresponding pair of first and second passageways, and the operative interconnection of control devices and actuated devices may be readily varied by relocating said diode valve means.

2. A control arrangement according to claim 1 further comprising relief means operatively communicating with said first and said second passageways for releasing any pressurization of said second passageways upon a change in pressure within any of said first passageways.

3. A control arrangement according to claim 2 wherein said relief means comprises a plurality of relief valve means each communicating with a corresponding one of said second passageways for selectively venting said one passageway, relief actuating means for actuating said plurality of relief valve means as a group and thereby for venting said second passageways, and pressure responsive means communicating with each of said first passageways and with said relief actuating means for responding to pressurization of any of said first passageways by momentarily operating said relief actuating means.

4. A control arrangement according to claim 1 each of said third passageways penetrates into said matrix block means from a first surface thereof and each of said third passageways comprises a first bore portion of predetermined diameter penertrating through a corresponding one of said first passageways, a second bore portion of lesser diameter penetrating into a corresponding one of said second passageways, and a shoulder portion intermediate said first and second passageways at the juncture of said first and second bore portions.

5. A control arrangement according to claim 4 wherein each of said diode valve means comprises a head portion for entering into said first bore portion of one of said third passageways, stem means extending from said head portion for penetrating into said third passageway, valving means mounted on said stem means for flow sealing engagement with said shoulder portion of said third passageway and for flow permitting displacement therefrom, and biasing means for urging said valving means toward said shoulder portion.

6. A control arrangement according to claim 4 wherein each of said plug means comprises a head portion for entering into aid first bore portion of one of said third passageways, stem means extending from said head portion for penetrating into said third passageway, and sealing means mounted on said stem means for penetrating into said second bore portion of said third passageway and for precluding flow therethrough.

7. A control arrangement according to claim 1 wherein said matrix block means has a first surface, each of said third passageways penetrates into said matrix block means from said first surface and each of said third passageways has one of said diode valve means and said plug means disposed therein and further comprising transparent retainer means extending parallel to said first surface for retaining said diode valve means and plug means in assembled relation with said matrix block means and for accommodating visual inspection of said diode valve means and plug means placement while the same are retained in assembled relation.

8. A control pressure fluid arrangement comprising;
  a plurality of pressure fluid actuated means for performing operations to be controlled,
  a plurality of pressure fluid control means for selectively passing pressure fluid,
  matrix block means for operatively interconnecting said actuated means and said control means and for dircting flow of pressure fluid passing from said control means to said actuated means, said matrix block means having a first series, a second series and a third series of passageways therethrough,
  conduit means for establishing operative communication between said control means and selected ones of said first series of passageways and for establishing operative communication between said second series of passageways and selected ones of said actuated means,
  diode valve means disposed in selected ones of said third series of passageways for permitting flow from corresponding selected ones of said first series of passageways into corresponding selected ones of said second series of passageways,
  plug means disposed in the remainder of said third series of passageways for blocking flow therethrough, and
  pressure relief means responsive to a change in pressurization of any of said first series of passageways for relieving pressure in said second series of passageways.

9. In a method of controlling a plurality of pressure fluid actuated devices by passage of pressure fluid through a plurality of pressure fluid control devices, an improved method of interconnecting such devices which facilitates assembly and modification of the control arrangement and comprising the steps of
  operatively interconnecting each pressure fluid control device with a selected one of a first series of parallel passageways extending through a matrix block for delivering pressure fluid thereinto,
  operatively interconnecting each pressure fluid actuated device with a selected one of a second series of parallel passageways extending through the matrix block for receiving pressure fluid therethrough,
  inserting plugs into selected ones of a third series of parallel passageways each extending through the matrix block and penetrating one of the first passageways and one of the second passageways, said insertion of plugs precluding flow between the one first and second passageways otherwise communicating by way of the selected ones of the third passageways,
  inserting one-way valves into the remainder of the third series of passageways for permitting flow therethrough only from the corresponding one of the second passageways and thereby for establishing operative interconnection between selected ones of the pressure fluid control devices and pressure fluid actuated devices while accommodating ready variation in such interconnection by relocation of the plugs and valves, and thereafter
  selectively actuating the pressure fluid control devices for delivering pressure fluid through the matrix block to the pressure fluid actuated devices.

10. A method according to claim 9 further comprising the step of responding to fluctuation of fluid pressure within any of the first passageways by venting all of the second passageways to the ambient atmosphere.

* * * * *

UNITED STATES PATENT OFFICE
CERTIFICATE OF CORRECTION

Patent No. 3,744,376              Dated July 10, 1973

Inventor(s) William T. Carpenter

It is certified that error appears in the above-identified patent and that said Letters Patent are hereby corrected as shown below:

Column 2, line 59, delete "30o" and insert therefor --30q--

Column 4, line 56, delete "300a" and insert therefor --30a--

Column 5, line 11, delete "concomitatn" and insert therefor --concomitant--

Column 6, line 45, following "Claim 1" insert --wherein--

Signed and sealed this 20th day of November 1973.

(SEAL)
Attest:

EDWARD M. FLETCHER, JR.
Attesting Officer

RENE D. TEGTMEYER
Acting Commissioner of Patents